(12) United States Patent
Götz et al.

(10) Patent No.: US 7,694,766 B2
(45) Date of Patent: Apr. 13, 2010

(54) COUNTERWEIGHTED FORK LIFT TRUCK WITH AT LEAST ONE AIR INTAKE OPENING IN THE VICINITY OF A STEP RECESS

(75) Inventors: Bernhard Götz, Aschaffenburg (DE); Constantin Roβkopf, Rodgau (DE)

(73) Assignee: Linde Material Handling GmbH, Aschaffenburg (DE)

( * ) Notice: Subject to any disclaimer, the term of this patent is extended or adjusted under 35 U.S.C. 154(b) by 292 days.

(21) Appl. No.: 11/891,046

(22) Filed: Aug. 8, 2007

(65) Prior Publication Data

US 2008/0101906 A1 May 1, 2008

(30) Foreign Application Priority Data

Aug. 10, 2006 (DE) .................. 10 2006 037 477

(51) Int. Cl.
*B60K 11/08* (2006.01)
(52) U.S. Cl. .................................. 180/68.1; 180/68.3
(58) Field of Classification Search ............... 180/68.1, 180/68.2, 68.3, 68.4, 68.5
See application file for complete search history.

(56) References Cited

U.S. PATENT DOCUMENTS

| | | | | | |
|---|---|---|---|---|---|
| 4,074,785 | A | * | 2/1978 | Masevice | 180/68.5 |
| 4,304,314 | A | * | 12/1981 | Sakaguchi et al. | 180/68.2 |
| 4,854,278 | A | * | 8/1989 | Honecker | 123/198 E |
| 5,285,863 | A | * | 2/1994 | Miki | 180/68.2 |
| 6,189,636 | B1 | * | 2/2001 | Kikukawa | 180/68.5 |
| 7,108,091 | B2 | * | 9/2006 | Guidry et al. | 180/68.1 |

FOREIGN PATENT DOCUMENTS

DE       8527273.6 U1    11/1985

* cited by examiner

*Primary Examiner*—Glenn Dayoan
*Assistant Examiner*—John D Walters
(74) *Attorney, Agent, or Firm*—The Webb Law Firm

(57) ABSTRACT

A counterweighted fork lift truck has a vehicle body (2) with an equipment compartment (R) located underneath a driver workplace (1). The equipment compartment and contains heat-emitting components. The vehicle body (2) includes at least one step (3) which forms the lower boundary of a step recess (3a) which is inboard with respect to the lateral contour (S) of the vehicle body. At least one air intake opening (5) for the supply of cooling air into the equipment compartment (R) is located in the vicinity of the step recess (3a).

19 Claims, 2 Drawing Sheets

COUNTERWEIGHTED FORK LIFT TRUCK WITH AT LEAST ONE AIR INTAKE OPENING IN THE VICINITY OF A STEP RECESS

CROSS REFERENCE TO RELATED APPLICATION

This application claims priority to German Application No. 10 2006 037 477.0, filed Aug. 10, 2006, which application is herein incorporated by reference in its entirety.

BACKGROUND OF THE INVENTION

1. Field of the Invention

This invention relates to a counterweighted fork lift truck having a vehicle body with an equipment compartment located underneath a driver workplace and containing heat-emitting components. The vehicle body is provided with at least one step that forms the lower boundary of a step recess which is inboard with reference to the lateral contour of the vehicle body.

2. Technical Considerations

A generic counterweighted fork lift truck is described in DE 85 27 273 U1. On this vehicle, a cooling air duct is provided for an electric motor which is located inside an equipment compartment or adjacent to it in the vicinity of a front-end drive axle. The cooling air duct has a hose-like line that leads from an intake point, which is located in the vicinity of a hood that covers the top of the equipment compartment, through the equipment compartment, to the electric motor. The purpose of this cooling air duct is to supply cool air that is taken in from an area where the air is relatively dust-free to cool the electric motor.

SUMMARY OF THE INVENTION

It is an object of the invention to provide a counterweighted fork lift truck of the general type described above but which has the simplest possible cooling air duct for the components located inside the equipment compartment, and in which the air provided for the cooling is taken from a relatively dust-free area.

The invention teaches that at least one air intake opening for the supply of cooling air into the equipment compartment is located in the vicinity of a step recess of the vehicle body.

The vicinity of the step recess is not only protected by its position, which is inboard in relation to the lateral contour of the vehicle body, but is also located relatively high above the road or floor. Thus, only a small amount of any road or floor dust that may be stirred up gets into the equipment compartment with the cooling air. At the same time, there is no need for special lines to conduct the cooling air to the components that emit heat.

In one advantageous embodiment of the invention, at least one air intake opening is located in a wall segment that is at a right angle to the lateral contour of the vehicle body and forms the rear boundary of the step recess.

In another, no less advantageous embodiment of the invention, at least one air intake opening is located in a wall segment that forms the boundary of the step recess with respect to the center of the vehicle.

If at least one air intake opening is in the form of a labyrinth passage, the amount of noise that escapes from the vehicle body is minimized.

The step recess is preferably open on top. Nevertheless, an embodiment that is closed on top is also conceivable.

In one embodiment, one step recess is provided on each of the two sides of the vehicle body, and at least one air intake opening is located in the vicinity of each of these recesses.

BRIEF DESCRIPTION OF THE DRAWINGS

Additional advantages and details of the invention are explained in greater detail below and are illustrated in the accompanying drawings which illustrate one exemplary embodiment of the invention. In the figures.

DESCRIPTION OF THE PREFERRED EMBODIMENTS

Figure 1:
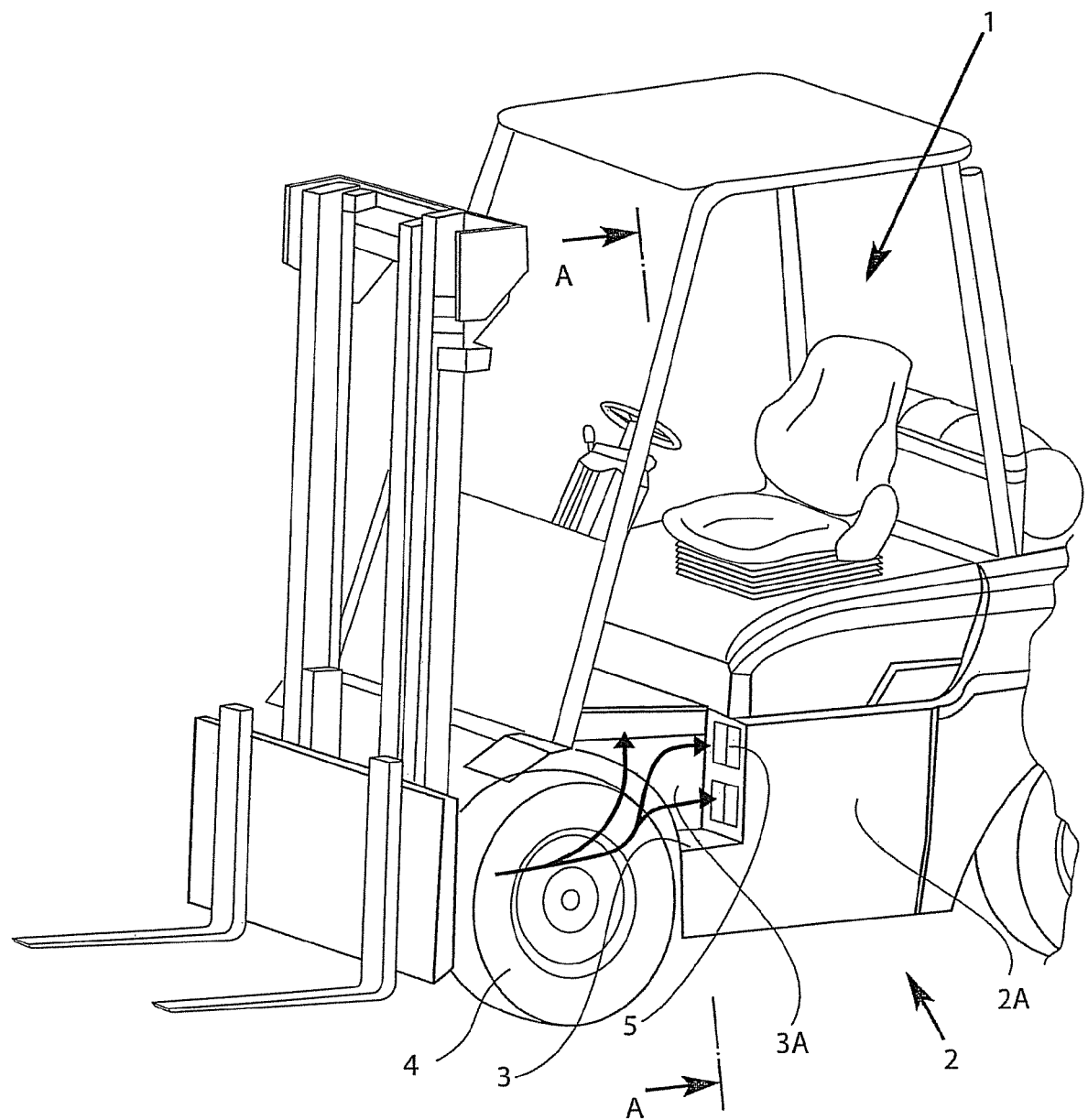
FIG. 1 is a perspective view of a counterweighted fork lift truck of the invention.
Figure 2:
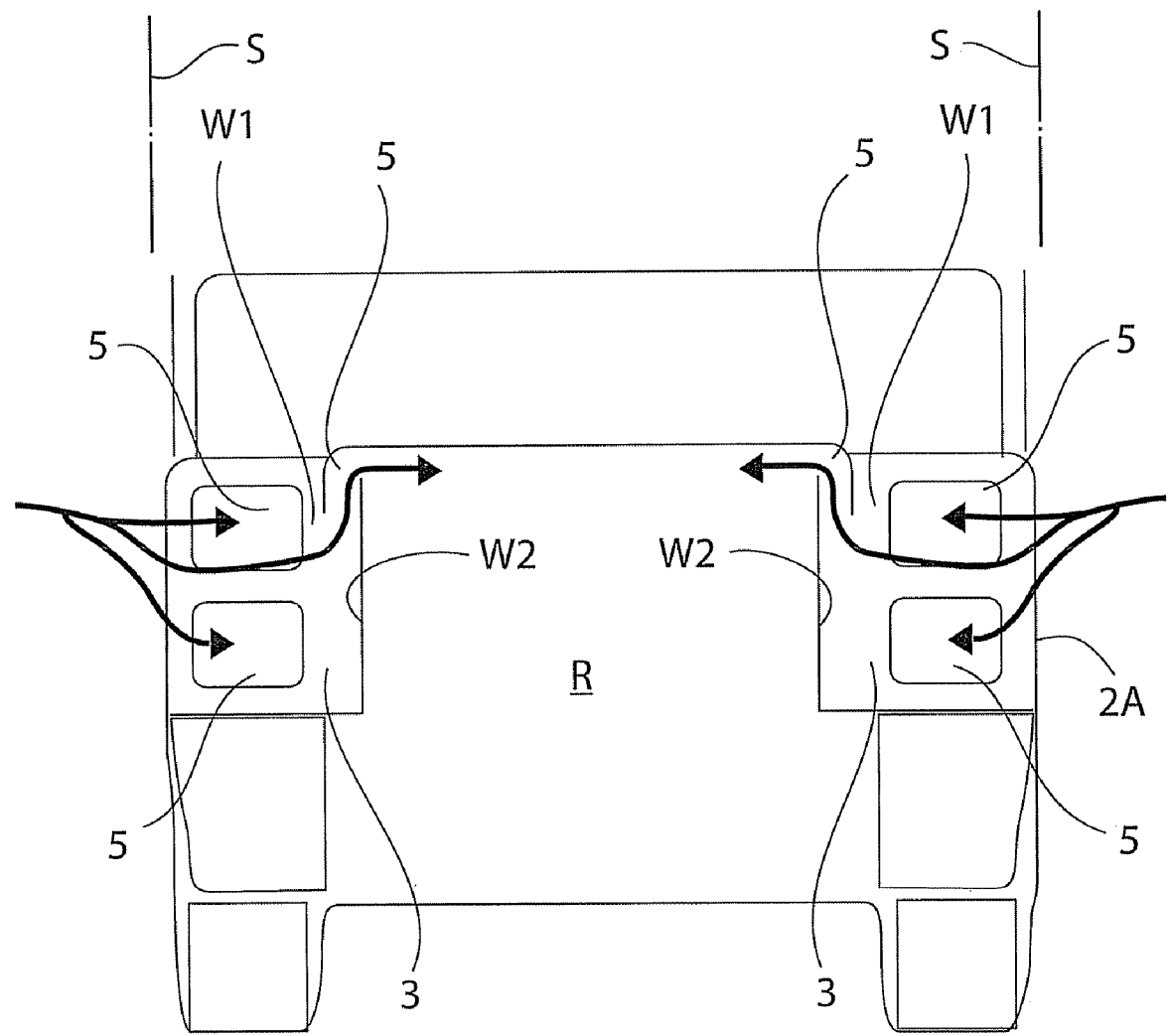
FIG. 2 is a cross section through the counterweighted fork lift truck along line A-A in FIG. 1.
Figure 2:

An exemplary counterweighted fork lift truck of the invention has a driver workplace 1, which is accessible via two steps 3, located one on each side of the vehicle body 2. Each step 3 defines the bottom of a step recess 3a which is open on top. The step recesses 3a are each located on either side of the vehicle body 2 rearward of a front wheel 4 and are recessed into a side wall 2a of the vehicle body 2. The step recesses 3a are therefore located inboard with respect to a lateral contour S (see FIG. 2) of the vehicle body 2 and do not project beyond the lateral contour S.

Inside the vehicle body 2, in an equipment compartment R (see FIG. 2) that is located underneath the driver workplace 1, there are components that emit heat. These heat-emitting components can be, for example, an internal combustion engine or a transmission, just to name a few. In the vicinity of at least one of the step recesses 3a there is at least one air intake opening 5, through which the cooling air can flow into the equipment compartment R (see arrows F in the figures). After the air flows through the equipment compartment R, the heated cooling air can be discharged back into the atmosphere, for example, through openings in the counterweight that are not shown in the figures.

In this exemplary embodiment, there are a plurality of air intake openings 5 in the vicinity of both step recesses 3a. A plurality of air intake openings 5 are worked into a wall segment W1 that forms the rear boundary of the step recess 3a and is oriented at a right angle to the lateral contour S of the vehicle body 2. On both sides of the vehicle body 2 there can also be respective air intake openings 5 in a wall segment W2 (in the upper area) that form the boundary of the step recess 3a with respect to the center of the vehicle and are realized in the form of a labyrinth passage to minimize the escape of noise from the equipment compartment R.

On account of the relatively large total cross section of the intakes, the flow velocities of the cooling air sucked in are low, as a result of which practically no dust is carried along during the intake of the cooling air. The counterweighted fork lift truck of the invention is therefore relatively insensitive to use in dirty/dusty environments. Special dust protection equipment is therefore generally unnecessary.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A counterweighted fork lift truck, comprising:
a vehicle body including an equipment compartment located underneath a driver workplace, the equipment compartment containing heat-emitting components,
wherein the vehicle body includes at least one step recess located inboard with respect to a lateral contour of the vehicle body, the step recess including a step lower than a floor of the driver workplace, a rear wall segment forming a rear boundary of the step recess and oriented at a right angle to the lateral contour of the vehicle body, and a side wall segment forming a boundary of the step recess with a vehicle center, and
wherein at least one air intake opening for supply of cooling air into the equipment compartment is located on at least one of the rear wall segment of the side wall segment.

2. The counterweighted fork lift truck as recited in claim 1, wherein at least one air intake opening is located on the rear wall segment.

3. The counterweighted fork lift truck as recited in claim 1, wherein at least one air intake opening is located on the side wall segment.

4. The counterweighted fork lift truck as recited in claim 1, wherein at least one air intake opening is in the form of a labyrinth passage.

5. The counterweighted fork lift truck as recited in claim 1, wherein the step recess is open on top.

6. The counterweighted fork lift truck as recited in claim 1, wherein respective step recesses are provided on both sides of the vehicle body, and at least one air intake opening is provided in each of these step recesses.

7. The counterweighted fork lift truck as recited in claim 2, wherein at least one air intake opening is located on the side wall segment.

8. The counterweighted fork lift truck as recited in claim 2, wherein at least one air intake opening is in the form of a labyrinth passage.

9. The counterweighted fork lift truck as recited in claim 3, wherein at least one air intake opening is in the form of a labyrinth passage.

10. The counterweighted fork lift truck as recited in claim 2, wherein the step recess is open on top.

11. The counterweighted fork lift truck as recited in claim 3, wherein the step recess is open on top.

12. The counterweighted fork lift truck as recited in claim 4, wherein the step recess is open on top.

13. The counterweighted fork lift truck as recited in claim 2, wherein respective step recesses are provided on both sides of the vehicle body, and at least one air intake opening is provided in each of these step recesses.

14. The counterweighted fork lift truck as recited in claim 3, wherein respective step recesses are provided on both sides of the vehicle body, and at least one air intake opening is provided in each of these step recesses.

15. The counterweighted fork lift truck as recited in claim 4, wherein respective step recesses are provided on both sides of the vehicle body, and at least one air intake opening is provided in each of these step recesses.

16. The counterweighted fork lift truck as recited in claim 5, wherein respective step recesses are provided on both sides of the vehicle body, and at least one air intake opening is provided in each of these step recesses.

17. The counterweighted fork lift truck as recited in claim 7, wherein at least one air intake opening is in the form of a labyrinth passage.

18. The counterweighted fork lift truck as recited in claim 17, wherein the step recess is open on top.

19. The counterweighted fork lift truck as recited in claim 18, wherein respective step recesses are provided on both sides of the vehicle body, and at least one air intake opening is provided in each of these step recesses.

* * * * *